United States Patent [19]

Park

[11] Patent Number: 5,801,974

[45] Date of Patent: Sep. 1, 1998

[54] CALCULATION METHOD AND CIRCUIT FOR OBTAINING A LOGARITHMIC APPROXIMATION VALUE

[75] Inventor: Byung-Chul Park, Puch'eon-city, Rep. of Korea

[73] Assignee: Samsung Electronics Co., Ltd., Suwon, Rep. of Korea

[21] Appl. No.: 731,208

[22] Filed: Oct. 10, 1996

[30] Foreign Application Priority Data

Oct. 13, 1995 [KR] Rep. of Korea .................. 95 35263

[51] Int. Cl.$^6$ ................................................. G06F 7/52
[52] U.S. Cl. ............................... 364/722; 364/748.5
[58] Field of Search ...................... 364/715.03, 718.01, 364/722, 748.18, 748.5

[56] References Cited

U.S. PATENT DOCUMENTS

| | | | |
|---|---|---|---|
| 5,365,465 | 11/1994 | Larson | 364/715.03 |
| 5,600,581 | 2/1997 | Dworkin et al. | 364/722 |
| 5,604,691 | 2/1997 | Dworkin et al. | 364/722 |
| 5,629,884 | 5/1997 | Pan et al. | 364/748.5 |
| 5,642,305 | 6/1997 | Pan et al. | 364/748.5 |

*Primary Examiner*—Chuong Dinh Ngo
*Attorney, Agent, or Firm*—Jones & Volentine, L.L.P.

[57] ABSTRACT

The present invention discloses a calculation method utilizing a circuit and a circuit for obtaining a logarithmic approximation value. The circuit minimizes the error in calculating a logarithmic approximation value by adding a simple circuit. The method includes the steps of obtaining a square value of an input data value, which is greater than or equal to 0 and less than 1. A subtracting step substracts the square value of the input data value from the input data value to obtain a first output result. The first output result is then divided by 4 to obtain a second output result. The input data value is then added to the second output result to obtaining a third output result.

4 Claims, 4 Drawing Sheets

CALCULATION METHOD AND CIRCUIT FOR OBTAINING A LOGARITHMIC APPROXIMATION VALUE

BACKGROUND OF THE INVENTION

1. Field of the Invention

The present invention relates to an improved calculation method and circuit for obtaining a logarithmic approximation value. More particularly, the invention relates to an improved calculation method and corresponding circuit for obtaining a logarithmic approximation value which can reduce the amount of error for a logarithmic approximation value.

2. Background of the Invention

In an audio signal, the signal change which can be heard by humans is proportional to its logarithmic value. Therefore, an electrical circuit acting as a logarithmic calculator is needed in order to make an active change to the sound in the audio signal, but it is difficult to implement such electronic hardware because a circuit acting as a digital calculator for producing precise calculations is very complicated and the size of the circuit is large.

Therefore, the logarithmic operation in a digital circuit is performed by a circuit adapted to correspond to an approximation equation, the method of operation of which may be described as follows.

Suppose that a numerical base for a log is 2, that a logarithmic operation result for any number N is L(N), and that the approximate value of the L(N) is LA(N). In such an example, it is convenient to select 2 as the base, because it is essential that the digital circuit process a binary number and base 2 makes it easier to provide a circuit for providing a calculation of the approximate value.

FIG. 1 illustrates a theoretical curve L(N) and an approximation curve LA(N) for L(N) connecting the points in which the value of L(N) is an integer.

In FIG. 1, LA(N) is illustrated by an equation of a straight line connecting x=1, 2, 4, and 8 for which the value of the L(N) is an integer since the L(A) is the curve of the binary log.

The following Table 1 illustrates the logarithmic values for several integers N expressed as decimal and binary values and their corresponding logarithmic approximation values also expressed as decimal and binary values:

TABLE 1

| | Logarithmic Values | | |
|---|---|---|---|
| decimal number | | binary number | |
| N | LA(N) | N | LA(N) |
| 8 | 3.000 | 01000 | 11.000 |
| 9 | 3.125 | 01001 | 11.001 |
| 10 | 3.250 | 01010 | 11.010 |
| 11 | 3.375 | 01011 | 11.011 |
| 12 | 3.500 | 01100 | 11.100 |
| 13 | 3.625 | 01101 | 11.101 |
| 14 | 3.750 | 01110 | 11.110 |
| 15 | 3.875 | 01111 | 11.111 |
| 16 | 4.000 | 10000 | 100.00 |

In Table 1 the comparison of the expression type of the approximation values LA(N) for the integer N and for the binary number corresponding to the integer N may be described as follows.

First, an integer part of the LA(N) is equal to a number of rest bit except "1" which is located in the most significant bit side in every bit of N. This value may be called a characteristic.

Secondly, a lower part of a decimal point of LA(N) consists of data down "1" which is located in the most significant bit side. This may be called a mantises.

For example, obtaining an approximation value for a binary log related to an 8 bit binary number N=10110110, the value of the characteristic is "111" since the number of the rest bit (except for the "1" which is located in the most significant bit side among every 8 bits) is 7, the value of the mantises is "110110110" except for the "1" which is located in the most significant bit side. The values are as follows.

N=10110110

LA(N)=111.011011

The value of binary number for N>1 may be expressed as follows.

$$N = 2^k \times (1+x) \tag{1}$$

The value k is a number of the bit between the position of "1" located in the most significant bit side and a point of binary number N; x is the number to add a point instead of the "1" of the most significant bit side since x consists of the rest bit except for the "1" which is located in the most significant bit side and x<1. For example, if N is 10110.101, N can be expressed by $2^4 \times (1+0.0110101)$ since k is 4, and x is 0.0110101.

In the above explanation, an logarithmic value L(N) may be expressed as follows for an integer of N>1.

$$L(N) = k + L(1+x) \tag{2}$$

Also, an logarithmic approximation value LA(N) corresponding to the equation (2) may be expressed as follows.

$$LA(N) = k + x \tag{3}$$

Therefore, calculation of the values k and x for obtaining the logarithmic approximation value LA(N) for the binary number N can be obtained by utilizing a simple shifting and counting function.

Further, the error value E(x) of the logarithmic approximation value obtained by the above equation (3) may be expressed as follows.

$$\begin{aligned} E(x) &= L(N) - LA(N) \\ &= L(1+x) - x \end{aligned} \tag{4}$$

In other words, the error value E(x) is independent from the value k, and is dependent upon the value x.

FIG. 2 illustrates an error curve corresponding to the error value E(x) of the approximation value, the error value E(x) has a non-negative value in every region. In FIG. 2 a maximum error $E_{max}=0.086$ is shown where x=0.44 and a minimum error 0 is shown where x=0.

The above is directed to elevating the precision of the calculation by decreasing the amount of the error showing the calculation of the approximation value since the circuit construction for calculating the approximation value is simpler than that of the binary logarithmic operation. However, it is difficult to implement the circuit because the algorithm for correcting the value of approximation calculation is complex causing the construction of a large circuit.

SUMMARY OF THE INVENTION

Accordingly, it is an object of the present invention to provide a method which utilizes a calculation means to obtain a logarithmic approximation value which can minimize the error value generating in an binary logarithmic approximation equation.

It is another object of the present invention to provide a calculation circuit including a means for obtaining a logarithmic approximation value which can minimize the error value which is generated by a circuit that corresponds to a binary logarithmic approximation equation.

To achieve an object of the present invention, the calculation method for obtaining the logarithmic approximation value comprises a step for obtaining a square of an input data which is greater than or equal to 0 and is less than 1, a subtracting step for subtracting the square value of the input data from the input data, a dividing step for dividing by 4 an output data resulting from the subtracting step, and an adding step for adding the input data to the resulting output data of the dividing step.

To achieve another object of the present invention, the calculation circuit of the logarithmic approximation value comprises a means for squaring an input data value which is greater than or equal to 0 and is less than 1, a first adding means for adding the input data value to the inverted data of the output data resulting from the squaring means, a shifting means for shifting by 2 bits to the right side a data down a decimal point of an output data of the first adding means, and a second adding means for adding the input data to the output data resulting from the shifting means.

BRIEF DESCRIPTION OF THE DRAWINGS

The above objects, and other features and advantages of the present invention will become more apparent after reading the following detailed description and by reference to the drawings, in which.

DETAILED DESCRIPTION OF PREFERRED EMBODIMENT

The calculation method and circuit of the logarithmic value according to the present invention may be described in detail by referring to the attached drawings.

Figure 1:
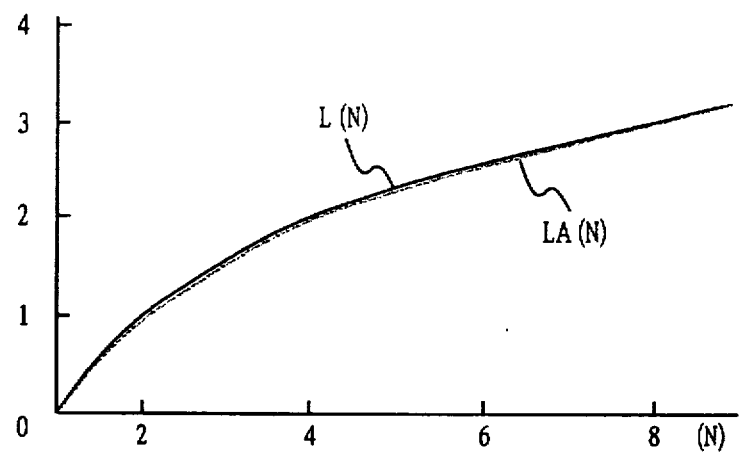
FIG. 1 illustrates curves connecting the points for a theoretical L(N) and an approximation curve LA(N) corresponding to the L(N) connecting points for which the value of L(N) is an integer.
Figure 2:
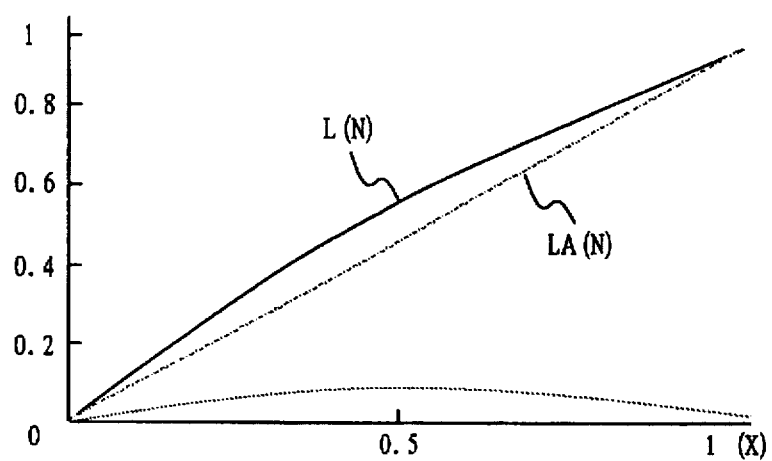
FIG. 2 illustrates an error curve determined by the error value E(x) for the approximation value.

As shown in FIG. 2, the present invention uses a mathematical function which has characteristics similar to the logarithmic curve which is adapted for correcting the amount of an error generated in the calculation of an approximation equation.

Figure 3:
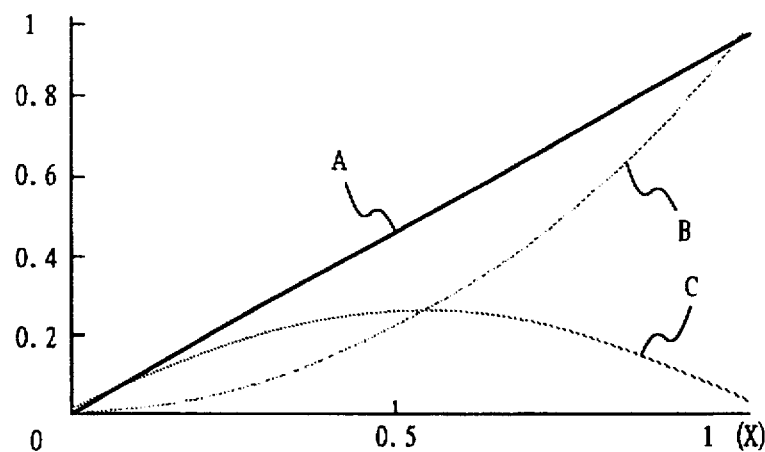
FIG. 3 illustrates graphs of several functions for values of x which are greater than or equal to 0 and less than 1.

FIG. 3 illustrates graphs of several functions for x values which are greater than or equal to 0 and are smaller than 1. Curve A is a graph of y=x, curve B is graph of $y=x^2$, and curve C is the graph of $y=x-x^2$.

In FIG. 3, curve C illustrates the differences between curves A and B, and is similar to the curve of the error value E(x) shown in FIG. 2.

If the shape of the curve is properly controlled by an experimental equation, the curve becomes similar to the error curve shown in FIG. 2. Thus, the curve of an original logarithmic value L(1+x) can be obtained by adding the value of the curve and the x value shown in FIG. 2.

The equation of an approximation logarithmic operation which approximates an amount of an error and the equation for obtaining an amount of an error are as follows:

$$LA_1(x) = \frac{x-x^2}{3} + x \tag{5}$$

$$E_1 = L(1+x) - LA_1(x) \tag{6}$$

According to equation (6), $E_1$ has a value of $E_{1max}=0.0097$ for x=0.2 and the value for $E_{1max}$ is small (about 8.9 times) compared with the error value $E_{max}$ of the error curve shown in FIG. 2.

Figure 4:
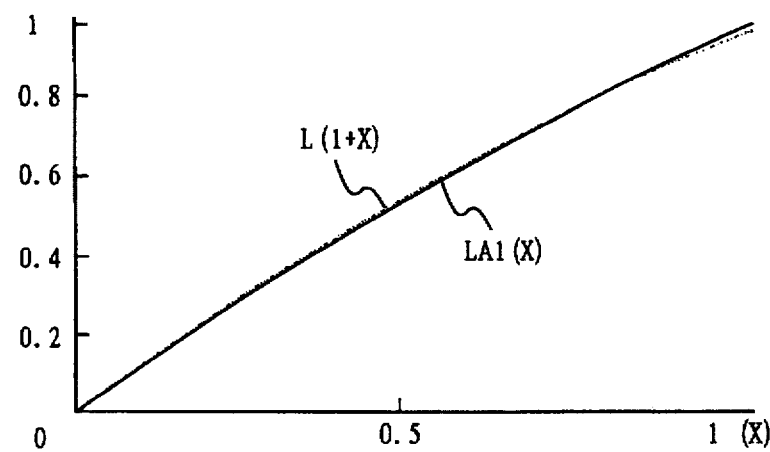
FIG. 4 illustrates curves defined by a logarithmic value L(1+x) and by a logarithmic approximation value $LA_1(x)$ according to the present invention.
Figure 5:
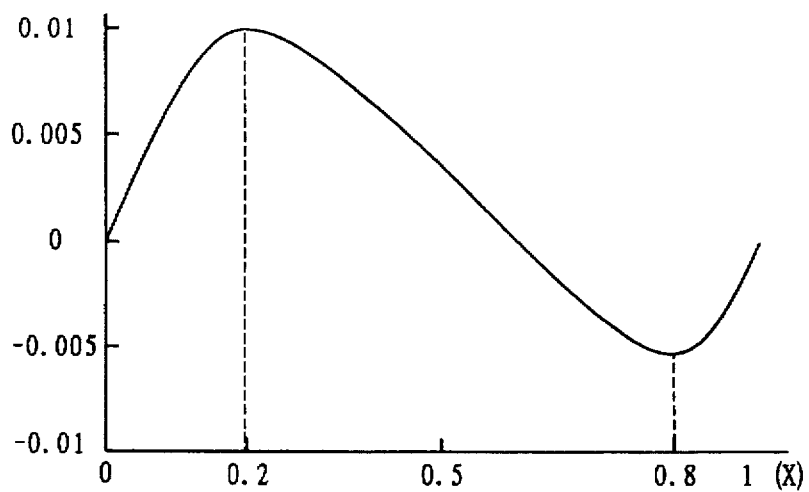
FIG. 5 illustrates a curve defined by the error values corresponding to $E_1(x)$ subsequent to correction according to the present invention.

FIG. 4 illustrates curves of an logarithmic value L(1+x) and an logarithmic approximation value $LA_1(x)$ according to the present invention, while FIG. 5 illustrates a curve of an error value $E_1(x)$ subsequent to correction according to the present invention.

In FIG. 5, at x=0.2, and 0.8 where the error value is the greatest, the error values points when x=0.2 and 0.8 are 0.0097 and −0.0053, respectively.

For implementing the circuit of the present invention by using equation (5), a multiplier, a divider, and a subtracter, among others, are additionally required.

If the multiplier and subtracter use conventional circuits, or a serial processing block, the circuit can be implemented in a very small area, but in case of divider, a large area is needed for implementing the circuit. By considering these points, the correcting equation, which can decrease the amount of an error of the approximation curve and be easily adopted in a circuit, is set forth in the following equation (7):

$$LA_2(x) = \frac{x-x^2}{4} + x \tag{7}$$

In equation (7), when dividing by 4, the circuit can be easily implemented by a practical binary operation to shift the decimal point down to the right side by 2 bits. In this case, the error value which is corrected has a precision of about 3.3 times as compared with the error value which is not corrected since the maximum error $E_{2max}$ is 0.026 when x=0.33.

Figure 6:
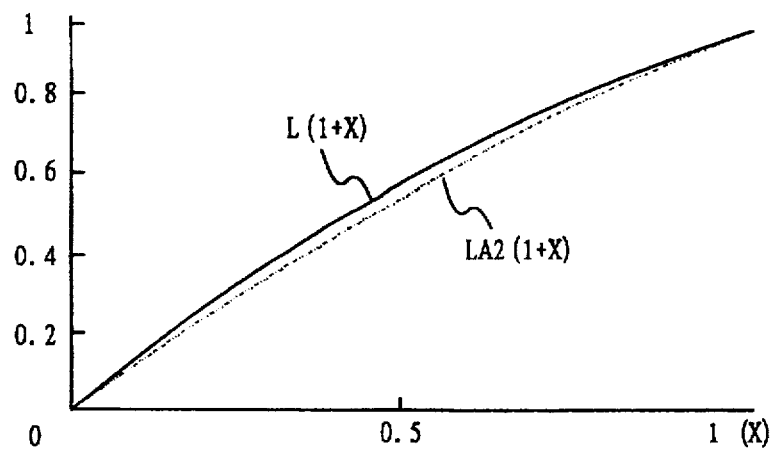
FIG. 6 illustrates an approximation logarithmic curve correcting an error which can easily be adopted in the circuit.
Figure 7:
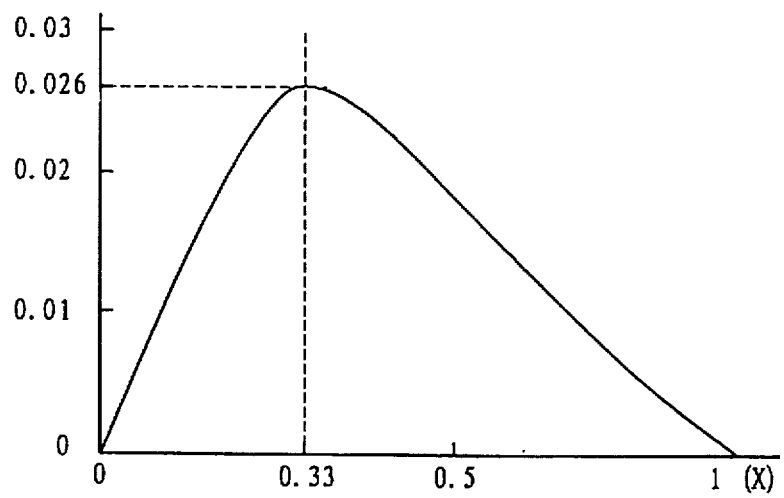
FIG. 7 illustrates an error curve showing the differences between the practical binary logarithmic value and the values resulting from correction of the error for the approximation logarithmic value.

FIGS. 6 and 7, respectively, illustrate an approximation logarithmic curve for correcting an error which can be easily adopted in a circuit, and an error curve which shows the difference between a binary logarithmic value and an approximation logarithmic value which is error-corrected.

Figure 8:
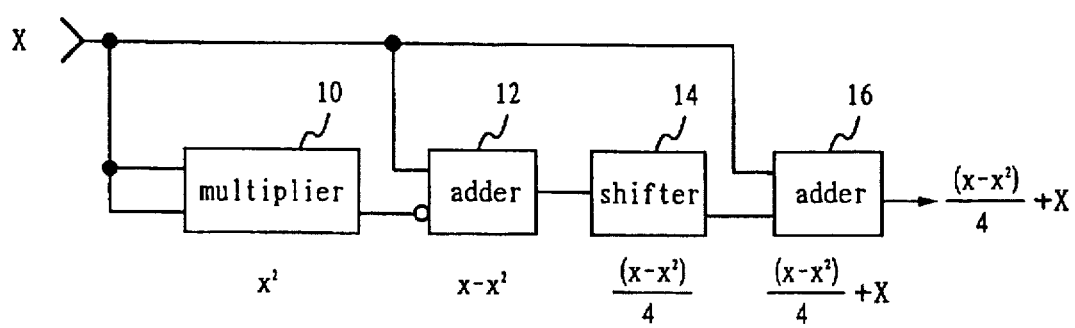
FIG. 8 is a block diagram of an error value correction circuit for obtaining a logarithmic approximation value according to an embodiment of the present invention.

FIG. 8 is a block diagram of an error value correction circuit embodiment according to the present invention for obtaining a logarithmic approximation value. The circuit as illustrated in FIG. 8 consists of a multiplier 10, an adder 12, a shifter 14, and an adder 16.

The multiplier 10 multiplies the value of an input signal x by itself (value of the input signal x) and outputs the signal value corresponding to $x^2$. The adder 12 adds the value of the inverted signal $-x^2$ of the output signal $x^2$ obtained from the multiplier 10 and the value of the input signal x and outputs an output signal which is a value corresponding to the formula $x-x^2$. The shifter 14 shifts down a point to the right side by a 2 bit value of the output signal $x-x^2$ of the adder 12 as $2^2$ shifter and outputs $(x-x^2)/4$. The adder 16 adds the input signal x and the output signal $(x-x^2)/4$ of the divider 14 and outputs signal $\{(x-x^2)/4\}+x$. By performing the above operation, the logarithmic approximation value shown in the equation (7) can be obtained. Of course, for obtaining the logarithmic approximation value shown in the equation (5), the circuit can be implemented by using a divider performing a division by 3 operation without using the shifter. However, such a procedure presents a problem in that the circuit construction becomes complicated in case of implementing the circuit by using a division by 3 operation.

Table 2, below, shows binary log values, approximation binary log values, and corrected approximation binary values obtained by the equations (6), and (7), in the case where x is greater than or equal to 0 and smaller than 1.

TABLE 2

| x | binary log L(1 + x) | approximation binary log | | corrected approximation binary log | | corrected approximation binary log | |
|---|---|---|---|---|---|---|---|
| | | LA(x) | E(x) | $LA_1(x)$ | $E_1(x)$ | $LA_2(x)$ | $E_2(x)$ |
| 0.0 | 0.0000 | 0.0 | 0.0000 | 0.0000 | 0.0000 | 0.0000 | 0.0000 |
| 0.1 | 0.1375 | 0.1 | 0.0375 | 0.1300 | 0.0075 | 0.1225 | 0.0150 |
| 0.2 | 0.2630 | 0.2 | 0.0630 | 0.2533 | 0.0097 | 0.2400 | 0.0230 |
| 0.3 | 0.3785 | 0.3 | 0.0785 | 0.3700 | 0.0085 | 0.3525 | 0.0260 |
| 0.4 | 0.4854 | 0.4 | 0.0854 | 0.4800 | 0.0054 | 0.4600 | 0.0254 |
| 0.5 | 0.5850 | 0.5 | 0.0850 | 0.5833 | 0.0016 | 0.5625 | 0.0225 |
| 0.6 | 0.6781 | 0.6 | 0.0781 | 0.6800 | −0.0019 | 0.6600 | 0.0181 |
| 0.7 | 0.7655 | 0.7 | 0.0655 | 0.7700 | −0.0045 | 0.7525 | 0.0130 |
| 0.8 | 0.8480 | 0.8 | 0.0480 | 0.8533 | −0.0053 | 0.8400 | 0.0080 |
| 0.9 | 0.9260 | 0.9 | 0.0260 | 0.9300 | −0.00040 | 0.9225 | 0.0035 |

From Table 2 it can be observed that binary log values and corrected approximation binary log values have a precision of over 99% in the case of $LA_1(x)$, and of over 98% in the case of $LA_2(x)$.

It is clear from the above discussion, that when implementing the logarithmic operation in the form of a circuit, if the circuit implemented is adapted to provide only an approximation logarithmic value, the circuit construction becomes simple, but the precision of operation decreases. On the other hand, if the circuit implemented is adapted to provide the corrected equation shown in the equation (7) and the circuits of serial operation for processing the circuit, including the shifter, adders and multiplier are added, the precision of operation highly increases.

Therefore, the calculation method and circuit according to the present invention can minimize an error of the logarithmic approximation value by adding a simple circuit.

While the present invention has been particularly shown and described with reference to the particular embodiments thereof, it will be understood by those skilled in the art that various changes in form and details may be effected therein without departing from the spirit and scope of the invention as defined by the appended claims.

What is claimed is:

1. The calculation method for obtaining a logarithmic approximation value, which utilizes a circuit to implement the method, comprising the steps of:

obtaining a square value of an input data value, utilizing a means for obtaining a square value, which is greater than or equal to 0 and less than 1;

subtracting, utilizing a substracting means for subtracting the square value of the input data value from the input data value and obtaining a first output result from said subtracting means;

dividing said first output result by 4, utilizing a dividing means and obtaining a second output result from said dividing means; and adding, utilizing an adding means for adding the input data value to the second output result and obtaining a third output result.

2. The calculation method for obtaining a logarithmic approximation value, which utilizes a circuit to implement the method, comprising the steps of:

obtaining a square value of an input data value, utilizing a means for obtaining a square value, which is greater than or equal to 0 and less than 1;

subtracting, utilizing a substracting means for subtracting the square value of the input data value from the input data value and obtaining a first output result from said subtracting means;

dividing said first output result by 3, utilizing a dividing means and obtaining a second output result from said dividing means; and adding, utilizing an adding means for adding the input data value to the second output result and obtaining a third output result.

3. A circuit for calculating a logarithmic approximation value of a signal and outputting a value, comprising:

a squaring means for squaring an input data value which is greater than or equal to 0 and less than 1, and obtaining a squared data value;

a first adding means for adding an inverted value of said squared data value and the input data value, and obtaining a first output result;

a shifting means for shifting a decimal point of a data value down to the right side by 2 bits for the first output result obtained from said first adding means to provide a second output result; and a second adding means for adding the input data and the second output result obtained from said shifting means to provide a third output result.

4. A circuit for calculating a logarithmic approximation value of a signal and outputting a value, comprising:

a squaring means for squaring an input data value which is greater than or equal to 0 and less than 1, and obtaining a squared data value;

a first adding means for adding an inverted value of said squared data value and the input data value, and obtaining a first output result;

a dividing means for dividing said first output result by 3 to provide a second output result; and a second adding means for adding the input data and the second output result obtained from said dividing means to provide a third output result.

* * * * *